United States Patent [19]

Robinson et al.

[11] 4,086,018
[45] Apr. 25, 1978

[54] DEBURRING TOOL

[75] Inventors: William R. Robinson, Farmington Hills; James L. Roberts, Clinton, both of Mich.

[73] Assignee: Robinson Tool Company, Redford Township, Mich.

[21] Appl. No.: 785,489

[22] Filed: Apr. 7, 1977

[51] Int. Cl.² .............................................. B23B 51/16
[52] U.S. Cl. ................................... 408/226; 408/147; 408/714
[58] Field of Search ............... 408/147, 186, 187, 188, 408/226, 714, 199, 200

[56] References Cited

U.S. PATENT DOCUMENTS

| | | | |
|---|---|---|---|
| 2,657,597 | 11/1953 | Pickering et al. | 408/200 |
| 2,895,356 | 7/1959 | Cogsdill | 408/714 X |
| 3,306,136 | 2/1967 | Gustkey | 408/226 |

Primary Examiner—Gil Weidenfeld
Attorney, Agent, or Firm—Reising, Ethington, Barnard, Perry & Brooks

[57] ABSTRACT

A deburring tool including an elongated arbor formed with a cutting blade recess. A unitary cutting tool has a cutting head with an elongated, flat, resilient blade extending therefrom. The blade is received in the recess, and mounting means secures the end of the blade opposite the cutting head to the arbor in non-pivotal relationship with respect to the arbor with the cutting head projecting from the recess, a portion of the blade extending from the mounting means being yieldable to permit the cutting head to move resiliently inwardly with respect to the recess.

4 Claims, 5 Drawing Figures

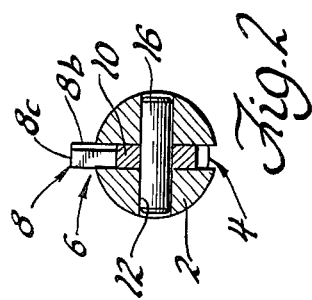
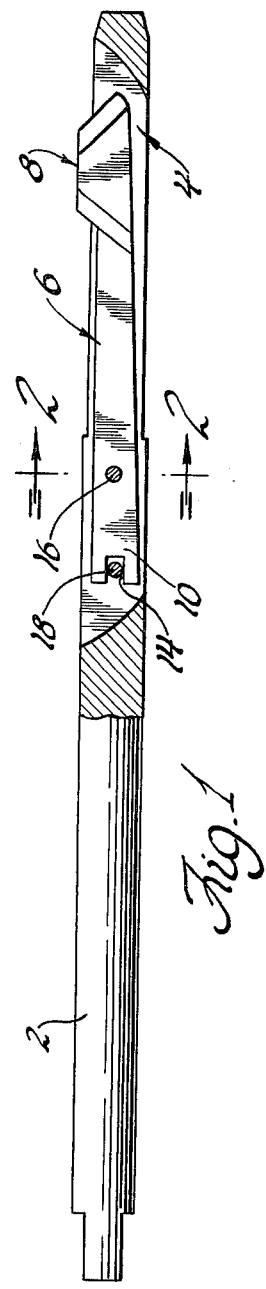
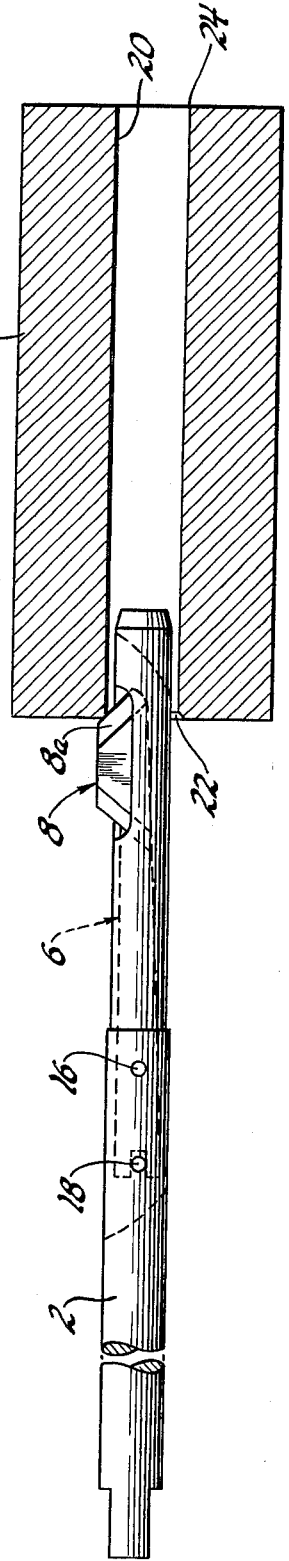
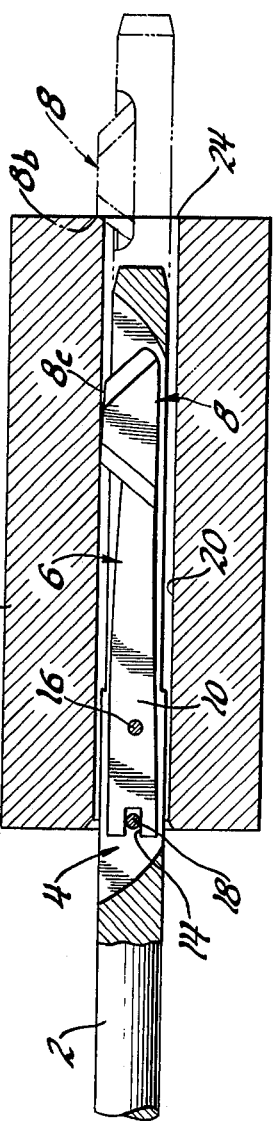
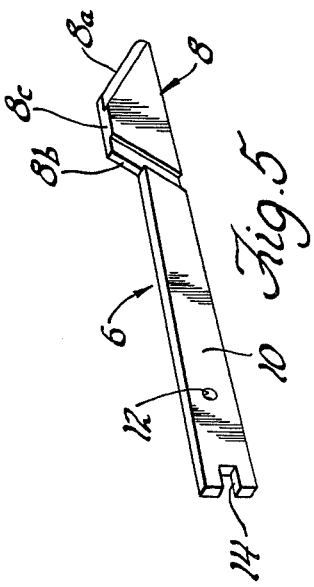

DEBURRING TOOL

BACKGROUND OF THE INVENTION

1. Field of the Invention

This invention relates to deburring tools, and is particularly concerned with the construction of a deburring tool having a replaceable cutting head.

2. Description of the Prior Art

Prior art deburring tools include two general types, one having a cutting tool pivotally mounted in an arbor with various types of spring arrangements for resiliently urging the cutting head of the cutting tool to an operable, extended position with respect to the arbor, and another type wherein the cutting tool is a slotted or bifurcated body to provide a pair of spaced spring arms having cutting blades formed on one or both of the arms. Examples of prior art deburring tools are disclosed in U.S. Pat. Nos. 2,895,356; 3,087,359; 3,298,256; 3,306,136; 3,411,386; 3,420,125 and 3,720,477.

SUMMARY OF THE INVENTION

An object of this invention is to provide an improved deburring tool having a unitary cutting tool non-pivotally mounted in a cutting tool recess in an arbor, the cutting tool having an integral, resilient blade for biasing the cutting head to an operable position extending from the recess wherein the blade can be easily removed and replaced from the cutting tool recess of the arbor.

A further object of this invention is to provide a deburring cutting tool of unitary construction having a cutting head with a resilient, flat blade extending therefrom with mounting openings formed in the end of the cutting blade opposite the cutting head for non-pivotally mounting the blade in a cutting tool recess of the arbor.

In carrying out the foregoing, and other objects, a deburring tool according to the present invention includes an elongated cylindrical body, or arbor, formed with a cutting blade recess. A unitary cutting tool has a cutting head with an integral elongated, flat, resilient blade extending therefrom and received in the recess. Mounting means secures the end of the blade opposite the cutting head to the arbor in non-pivotal relationship with respect to the arbor with the cutting head projecting from the recess, and the portion of the blade extending from the mounting means being resiliently yieldable to permit the cutting head to move inwardly with respect to the recess during a deburring operation.

Other objects, advantages and features of the invention will become apparent from the following description taken in connection with the accompanying drawings in which:

DESCRIPTION OF THE DRAWINGS

FIG. 1 is an elevational view partially in section, of a deburring tool embodying the present invention;

FIG. 2 is a sectional view taken on lines 2—2 of FIG. 1;

FIG. 3 is an elevational view of the deburring tool of FIGS. 1 and 2 illustrated in position with a work piece at the beginning of a deburring operation;

FIG. 4 is a sectional view of the deburring tool and work piece of FIG. 3 with the cutting head of the deburring tool shown in an intermediate position within the hole of the work piece in full lines, and in the reverse deburring position in phantom lines; and FIG. 5 is a perspective view of the cutting tool of the deburring tool of the invention.

DESCRIPTION OF THE PREFERRED EMBODIMENTS

In the drawings, an elongated cylindrical body or arbor is designated by reference numeral 2 and is formed with a cutting tool recess or slot 4, the slot 4 extending diametrically through the cylindrical body 2 as shown in FIG. 2. Mounted in the arbor 2 is a unitary cutting tool 6 having a cutting head 8 with an elongated, resilient, flat plate 10, extending rearwardly, or toward the left as viewed in the drawings, from the cutting head 8. The blade 10 is received in the slot or recess 4 with the flat sides of the blade in parallel relationship with the sides of the slot 4.

The blade 10 is formed with a pair of spaced openings 12 and 14, and mounting means in the form of pins 16 and 18 extend through the arbor transversely of the recess 4 and through the openings 12 and 14 to secure the end of the blade opposite the cutting head 8 in non-pivotal relationship with the arbor 2. The opening 14 is in the form of a rearwardly directed, open-ended notch formed in the trailing end of the blade 10. Consequently, the cutting tool 6 can be removed from the arbor 2 simply by removing the pin 16.

With the pins 14 and 16 securing the blade 10 in non-pivotal relationship with respect to the arbor 2, the cutting head 8 is supported by the blade 10 in an operable position in which it projects from the recess 4 in the unstressed condition of the blade 10 (the position illustrated in the FIG. 1); however, the portion of the blade 10 extending from the pin 16 to the cutting head 8 is resiliently yieldable so that the cutting head 8 can move inwardly with respect to the recess 4 as is illustrated in FIG. 4.

The cutting head 8 includes a top, non-cutting surface 8c with a leading cutting edge 8a and a trailing cutting edge 8b extending angularly from opposite ends of the top edge 8c.

FIG. 3 illustrates a work piece W in cross section formed with a hole 20, the hole being formed by drilling or some similar operation. The hole 20 has a leading end 22 and a trailing end 24. With reference to FIG. 3, at the beginning of the deburring operation, the arbor 2, mounted in a rotating chuck or tool holder, is rotated and advanced toward the right as viewed in FIG. 3 with the leading cutting edge 8a engaging the leading end 22 of the hole 20 to remove burrs and form a slight chamfer as indicated by reference numeral 22 in FIG. 3. As the tool advances to the right to the positions shown in FIG. 4, the blade 10 bends about the pins 16 and 18 to cause the top, non-cutting edge 8c to engage the wall of the hole 20 as the blade moves through the hole 20. When the cutting head 8 clears the trailing end of the hole 20 at 24, as indicated in phantom lines, in FIG. 4, the direction of movement of the tool is reversed and the trailing cutting edge 8b removes burrs and slightly chamfers the trailing end of the hole 20 of the work piece W. As the blade is moved toward the left as viewed in FIG. 4, the engagement of the trailing edge 8b with the end of the hole causes the blade 10 to yield and permit the cutting head 8 to assume the full line position as shown in FIG. 4 as the tool is withdrawn from the hole 20 of the work piece W.

The amount of pressure applied by the cutting edges 8a and 8b is determined by the resiliency of the blade 10. The resiliency may be varied by increasing or decreasing the thickness of the blade or by proper selection of material. As pointed out previously, removal of the pin 16, permits removal of the cutting tool 6.

While a specific form of the invention is described in the foregoing specification and illustrated in the accompanying drawings, the invention is not limited to the exact construction as shown. To the contrary, alterations in the construction and arrangement of parts, all falling within the scope and spirit of the invention, will be apparent to those skilled in the art.

The embodiments of the invention in which an exclusive property or privilege is claimed are defined as follows:

1. A deburring tool comprising: an elongated arbor formed with a cutting blade recess; a unitary cutting tool having a cutting head with an elongated, flat, resilient blade extending therefrom and received in said recess; and mounting means securing the end of said blade opposite said cutting head to said arbor in non-pivotal relationship with respect to said arbor with said cutting blade projecting from said recess and the portion of said blade extending from said mounting means being yieldable to permit said cutting head to move inwardly with respect to said recess, said mounting means comprising a pair of axially spaced pins mounted in said body and extending transversely through said recess and said blade.

2. A deburring tool as claimed in claim 1 wherein said blade has an open ended notch formed therein for receiving one of said pins.

3. A deburring tool as claimed in claim 3 wherein said notch is formed in the trailing end of said blade and opens rearwardly with respect to said cutting head.

4. A deburring tool as claimed in claim 3 wherein said cutting head has a top, non-cutting edge and leading and trailing cutting edges extending angularly from opposite ends of said top edge.

* * * * *